Feb. 25, 1969 J. E. SCHINDALL 3,430,163

BANDPASS FILTER HAVING VARIABLE BANDWIDTH BUT CONSTANT MIDBAND RESPONSE AND VARIABLE LOADING CIRCUIT FOR THE SAME

Filed Sept. 17, 1963

INVENTOR

JOEL E. SCHINDALL

BY Hurvitz & Rose

ATTORNEYS

INVENTOR
Joel Schindall
BY Hurwitz & Rose
ATTORNEYS

United States Patent Office 3,430,163
Patented Feb. 25, 1969

3,430,163
BANDPASS FILTER HAVING VARIABLE BANDWIDTH BUT CONSTANT MIDBAND RESPONSE AND VARIABLE LOADING CIRCUIT FOR THE SAME

Joel E. Schindall, Mount Vernon, N.Y., assignor to The Singer Company, New York, N.Y., a corporation of New Jersey Filed Sept. 17, 1963, Ser. No. 309,528
U.S. Cl. 333—72 22 Claims
Int. Cl. H01p *7/00;* H03h *7/12*

ABSTRACT OF THE DISCLOSURE

A bandpass filter is provided with a control circuit by which the filter bandwidth is electronically varied while maintaining a constant midband response. For a crystal filter, the load in series with the filter is a parallel RLC network tuned to the crystal frequency, and the control circuit is inductively coupled to the load to vary the effective load resistance at resonance, and hence filter selectivity. Load voltage and current vary in opposite directions and are sensed, the sensed current converted to a voltage and combined with the load voltage as an output of the circuit, in accordance with a function of the effective resistance of the crystal in series resonant mode, to provide the desired substantially constant midband gain as filter selectivity is varied.

The present invention relates generally to circuitry for controlling the selectivity of band-pass filters, and more particularly to systems for maintaining constant the response of a variable selectivity band-pass filter with variation of selectivity thereof.

In the design of radio receivers generally, and of superheterodyne type spectrum analyzers in particular, it is required to provide a relatively narrow band selective circuit or filter and to provide for variation of selectivity or band-pass of the selective circuit. In the case of a spectrum analyzer variation of band-pass of the filter is desired in order to vary the resolution of the analyzer. Certain types of spectrum analyzers, for example, those illustratively disclosed in U.S. Patent No. 2,661,419, issued to B. Tongue, and dated Dec. 1, 1953, require a continuous variation of bandwidth in the course of a single sweep of the analyzer, to permit effective utilization of non-linear scan rates. In such systems it is required that bandwidth be electronically or electrically variable, i.e. that bandwidth be a function of a control voltage. It is further required that the gain of the filter at midband be maintained constant during the sweep, and that the system employed be utilizable with crystal filters.

Usual methods of varying bandwidth of a crystal filter involve varying the loading of the crystal. These methods produce output signal across the crystal load the amplitude of which at midband frequency is a function of loading and therefore of bandwidth, and are therefore unsatisfactory for the above specified application.

In accordance with the present invention, both the voltage across a filter load and the current through the load are simultaneously utilized to generate filter response or output. The filter is connected in series with the load. Load is varied to vary filter bandwidth, as is usual, but use is made of the fact that as load impedance decreases, load voltage decreases due to voltage division in the series circuit, while filter current increases due to decreased total impedance in the filter and load circuit. Increased current is translated to increased voltage, and decreasing and increasing voltages are suitably combined to provide a constant voltage as filter output, whereby midband gain of the filter remains constant for any value of filter load or bandwidth. The general principles hereinabove explained have been disclosed and claimed in application for U.S. patent Ser. No. 81,875, filed Jan. 10, 1961, now Patent No. 3,164,780, issued Jan. 5, 1965, in the name of Bela Ranky, which is assigned to the assignee of the present invention. In accordance specifically with the present invention, certain mathematical relationships are observed, in respect to the parameters of the system, with the result that performance is optimized, provision is made for wholly electronic operation in response to a control voltage, and a novel circuit configuration is provided.

It is, accordingly, a broad object of the invention to provide a novel electronically controlled selectivity control circuit for a band-pass filter.

It is another object of the invention to provide a novel electronically controlled bandpass control circuit for a bandpass filter, wherein the midband response of the filter remains constant during variation of bandpass.

Still another object of the invention is to provide a crystal filter having a tuned circuit as a load in series with the filter, and provision for varying resistance loading of the tuned circuit to vary bandwidth of the filter.

Still another object of the invention is to provide an improved constant gain, variable bandwidth circuit of a type wherein voltage and current responses of the circuit are concurrently employed to provide desired performance characteristics.

A further object of the invention is to provide a novel constant gain, variable bandwidth circuit of a type wherein parameters are selected so as to optimize attainment of constant gain as a function of bandwidth.

A subsidiary object of the invention is to provide a novel voltage responsive variable loading device for a resonant circuit.

The above and still further objects, features and advantages of the present invention will become apparent upon consideration of the following detailed description of one specific embodiment thereof, especially when taken in conjunction with the accompanying drawings, wherein.

Figure 1:
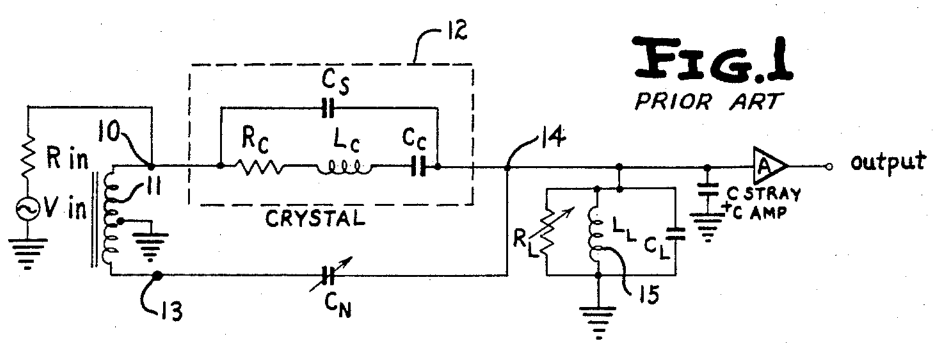
FIGURE 1 is a partial basic circuit diagram of a prior art bandwidth control circuit.
Figure 3A:
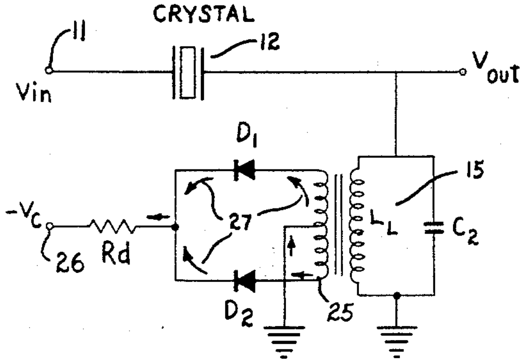
Figure 3B:
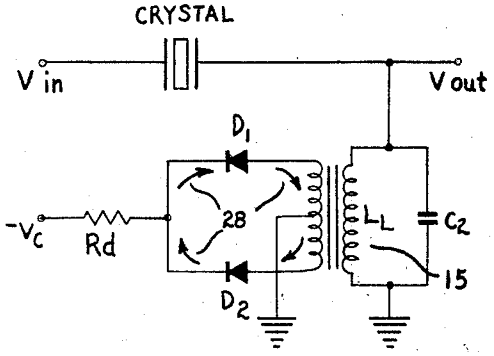
Figure 4:
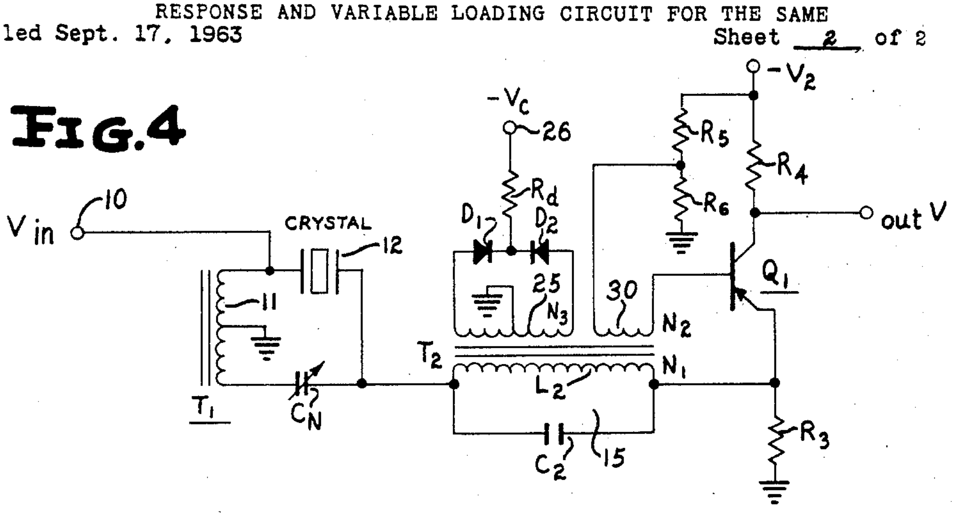
Figure 5:
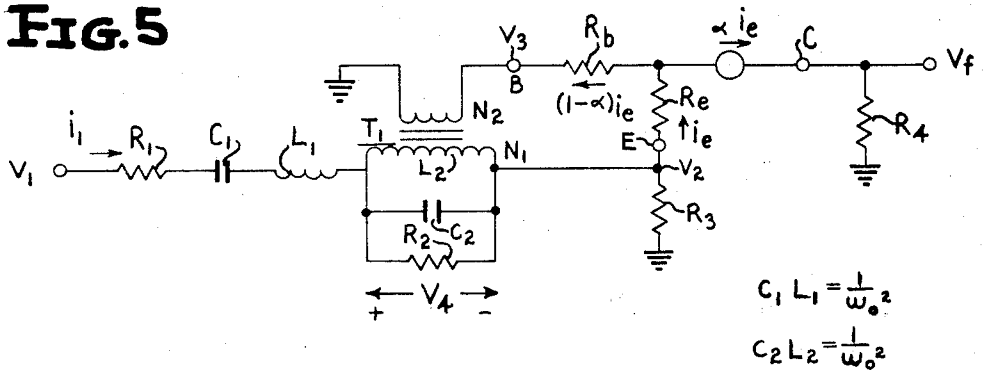
Figure 6:
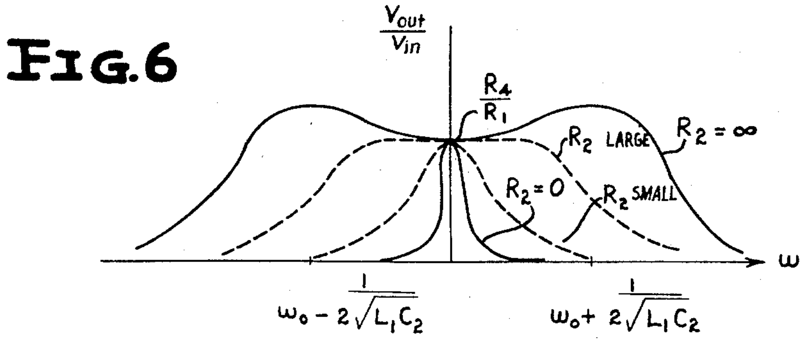

FIGURES 3*a* and 3*b* are circuit diagrams of voltage controlled loading circuits, showing respectively DC and AC paths of current flow, utilizable in conjunction with the system of FIGURE 1;

FIGURE 4 is a complete circuit diagram of a gain compensated voltage controlled bandwidth adjustable circuit, according to the invention;

FIGURE 5 is a circuit equivalent of FIGURE 4, simplified to facilitate analysis; and FIGURE 6 is a plot of bandwidth characteristics of a tuned circuit, in terms of amplitude of response versus frequency, for various values of a control parameter.

Bandwith is adjusted by varying the loading of a crystal operated in the series resonant mode. Using a simple resistance as the load leads to difficulty. The stray capacitance to ground appearing across the load resistor acts as a fixed load impedance in parallel with the load resistor itself. This places an upper limit on the effective loading of the crystal. To avoid this effect, a parallel RLC network tuned to the crystal frequency is used as the load. Any stray capacity appearing across the network is merely lumped together with the capacity of the load in tuning the load. R varies the magnitude of the load, and hence serves as the bandwidth control. (See FIG. 1).

Referring now more particularly to the accompanying drawings, FIGURE 1 represents a basic or idealized bandwidth control circuit, without gain compensation, of the prior art type $V_{in}$ represents a source of signal, having internal resistance $R_{in}$. The signal $V_{in}$ is applied to one terminal 10 of a ecnter grounded inductance 11. Terminal 10 proceeds to a piezoelectric crystal 12, tuned to provide a filter at a desired frequency. Crystal 12 is illustrated as having an equivalent circuit composed of inductance $L_c$, capacitance $C_c$ and resistance $R_c$, all in series, pertaining to the crystal per se, and shunted by capacitance $C_s$ pertaining to the crystal electrodes. This representation is conventional. The remaining terminal 13 of inductance 11 proceeds through a neutralizing capacitor $C_n$, which neutralizes the capacitance $C_s$ by providing equal out of phase voltages at output terminal 14, in the usual fashion.

The signal at terminal 14, representing filter output, is applied across a load circuit composed of a parallel resonant circuit 15, having inductance $L_L$ and capacitance $C_L$, shunted by an adjustable loading resistance $R_L$. Circuit 15 is tuned to the same frequency as the crystal, which sees the circuit 15 as a resistance, at midfrequency, the value of which is variable as $R_L$ varies.

While this circuit gives satisfactory control of filter bandwith, insertion loss of the filter depends upon the magnitude of the crystal load, since crystal and load form a voltage divider with the output taken across the load. The gain is therefore strongly dependent on bandwidth, with gain increasing as bandwith increases. As previously noted, this effect is undesirable.

At midband frequency, $\omega=\omega_0$, the crystal presents a constant low impedance $R_c$. As load impedance decreases, a decrease voltage tends to develop across the load. However, since the total impedance seen by $V_{in}$, given by $R_{in}+R_c+R_L$, decreases with decreasing $R_L$, an increased current tends to flow through the load. By detecting this current, converting it to a voltage, and properly mixing it with the original load voltage, the resulting midband gain will remain constant for any value of $R_L$. (See FIG. 2).

Figure 2:
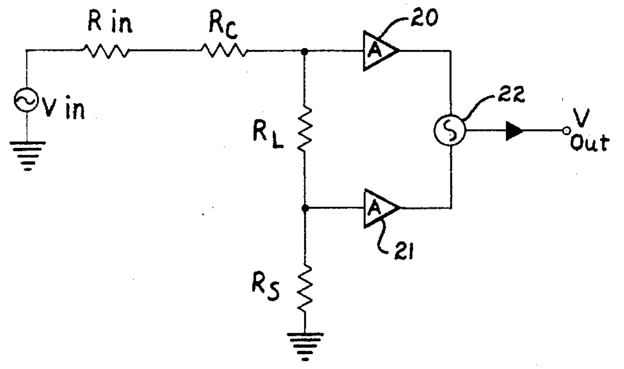
FIGURE 2 is a circuit diagram of a gain compensation circuit, utilizable in the system of FIGURE 1, according to the invention.

The basic circuit employed for gain compensation is illustrated in FIGURE 2. In this figure signal source $V_{in}$, having internal resistance $R_{in}$ is in series with $R_c$, the resistance of crystal 12. $R_L$ is the equivalent resistance of load 15, and $R_s$ is a small resistance used to convert load current to an equivalent voltage, without materially affecting load current. All elements, i.e., $V_{in}$, $R_{in}$, $R_c$, $R_L$ and $R_s$ are in series across $V_{in}$. Two amplifiers 20 21, derive the voltages across $R_L$ and $R_s$ respectively and apply them to an additive mixer 22, from which may be derived $V_{out}$, representing the desired gain controlled output signal, provided the parameters of the circuit are properly selected. This can be shown to occur for $$\frac{A}{B}=\frac{R_c+R_{is}}{R_s} \tag{1}$$

where A and B are the voltage gains of amplifiers 20 and 21, respectively.

In the simplified configuration of FIGURE 1 it is assumed that $R_L$ is variable. It is desired to vary $R_L$ electrically, i.e., in response to a control voltage. To this end, and with reference to FIGURE 3A, inductance $L_L$ is inductively coupled to a center grounded coil 25, to the end terminals of which are connected the anodes of diodes D1, D2, respectively, the cathodes of which are jointly connected to a control terminal 26, via a large series resistance $R_d$. The latter has the function of limiting control current to the diodes D1, D2 and of minimizing the effect of diode resistance variation with temperature. The control voltage applied to terminal 26 is negative, so that the diodes D1, D2 are equally biased in a forward direction, DC current flow paths being illustrated by arrows 27.

AC current flow paths for the circuit of FIGURE 3*a* are illustrated in FIGURE 3*b*, by arrows 28. It will be clear that the AC current paths, for either direction of current flow, involve passage through a diode from cathode to anode. No capacitors are required in the control circuit and its effect, as circulating currents represented by arrows 28 vary with change of bias on diodes D1, D2. The function of the coupled circuit is that of reflecting resistance into tank circuit 15. The location of $R_d$, outside of the AC current path, eliminates its value from the effective reflected resistance.

An actual practical circuit configuration is illustrated in FIGURE 4, the significance of identical numerals of reference in the several figures of the drawings being identical, so that further detailed explanation of the circuit diagram of FIGURE 4 may be minimized.

In FIGURE 4, a secondary winding 30 is coupled with inductance L2 ($L_L$ in FIGURE 1). The capacitance C2 is equivalent to $C_L$ in FIGURE 1. Windings L2, 30 and 25 have numbers of turns represented by N1, N2, N3, respectively. Crystal 12 is operated in series mode, as in FIGURE 1.

The actual circuit configuration employed, as shown in FIGURE 4 employs a crystal 12, operated in the series resonant mode, which functions as a bandpass filter. $T_1$ and $C_N$ neutralize the parallel capacity of crystal and holder. The series resistance of D1 and D2, denoted as $R(D_1+D_2)$, is reflected through $T_2$ to appear in parallel with $C_2$. The inductance $L_2$ presented by winding $N_1$ of $T_2$, together with $C_2$ and $R(D_1+D_2)$, form the parallel RLC crystal load. $R_3$ is sufficiently small that its loading effect on the crystal may be neglected in comparison to the load of the RLC circuit. $R_3$ detects the current through crystal and load, and the resulting voltage is coupled to the emitted of $Q_1$. Winding $N_2$ of $T_2$ senses the voltage across the loading coil, and feeds this voltage to the base of transistor $Q_1$. Transistor $Q_1$ combines and amplifies the current-sensing input and the voltage-sensing input. For midband gain independent of bandwidth, these inputs must be combined in proportion such that circuit gain is independent of $R(D_1+D_2)$.

For purposes of analysis, the circuit of FIGURE 4 may be approximated by the AC incremental model of FIGURE 5. The model predicts, where $R_T=[R_e+(1-\alpha)R_b]$:

$$\frac{V_{out}}{V_{in}}=-\alpha R_4\frac{\left[jC_2\left(\omega-\frac{\omega_0^2}{\omega}\right)+\frac{1}{R_2}\right]+\frac{N_2}{N_1}\frac{1}{R_3}}{\left[1+\frac{R_T}{R_3}\right]-\frac{N_2}{N_1}+\left[1+R_T\left(\frac{1}{jL_1\left(\omega-\frac{\omega_0^2}{\omega}\right)+R_1}\right)+\frac{R_T}{R_3}\right]\left[jC_2\left(\omega-\frac{\omega_0^2}{\omega}+\frac{1}{R_2}\right)\right]\left[jL_1\left(\omega-\frac{\omega_0^2}{\omega}\right)+R_1\right]} \tag{2}$$

Condition of midband gain independent of bandwidth:

$$R_3=\frac{N_2}{N_1-N_2}R_1 \tag{3}$$

The transfer function with above condition satisfied is:

$$\frac{V_{out}}{V_{in}}=-\alpha R_4\frac{\left[jC_2\left(\omega-\frac{\omega_0^2}{\omega}\right)+\frac{1}{R_2}\right]+\frac{N_1-N_2}{N_1}\frac{1}{R_1}}{\frac{N_1-N_2}{N_1}\left[1+\frac{N_1}{N_2}\frac{R_T}{R_1}\left\{1+\left(jL_1\left(\omega-\frac{\omega_0^2}{\omega}\right)+R_1\right)\left(jC_2\left(\omega-\frac{\omega_0^2}{\omega}\right)+\frac{1}{R_2}\right)\right\}\right]+\left[jL_1\left(\omega-\frac{\omega_0^2}{\omega}\right)+R_1+R_T\right]\left[jC_2\left(\omega-\frac{\omega_0^2}{\omega}+\frac{1}{R_2}\right]} \tag{4}$$

which becomes at $\omega=\omega_0$:

$$\left.\frac{V_{out}}{V_{in}}\right|_{\omega=\omega_0}=-\frac{\alpha R_4}{R_1+R_T\frac{N_1}{N_2}} \tag{5}$$

The following conditions obtain for narrow bandwidth (high resolution):

With $R_2=0$ and $R_T$ small, $\alpha\approx 1$ $$\frac{V_{out}}{V_{in}}=-\frac{R_4}{jL_1\left(\omega-\frac{\omega_0^2}{\omega}\right)+R_1} \tag{6}$$

The bandpass plot is then simply a plot of the crystal impedance. The following conditions obtain for broad bandwidth (low resolutions):

With $R_2=\infty$

Using (14) to substitute for $i_1$, in (17)

$$i_e=-\frac{N_1}{N_2}\frac{1}{Z_2}V_3-\frac{1}{R_3}V_3-\frac{R_T}{R_3}i_e$$

$$i_e=\frac{-\frac{1}{R_3}-\frac{N_1}{N_2}\frac{1}{Z_2}}{1+\frac{R_T}{R_3}}V_3 \tag{18}$$

Now $$V_1=V_2+V_4+i_1Z_1 \tag{19}$$

Using Equations 16, 18, 12, and 14 to express $V_2$, $V_4$ and $i_1$, in terms of $V_3$, we obtain $$V_1=V_3\left[1+\frac{-\frac{R_T}{R_3}-\frac{N_1}{N_2}\frac{R_T}{Z_2}}{\frac{R_3+R_T}{R_3}}-\frac{N_1}{N_2}=\frac{N_1}{N_2}\frac{R_1}{Z_2}\right] \tag{20}$$

$$\frac{V_{out}}{V_{in}}=-\alpha R_4\frac{jC_2\left(\omega-\frac{\omega_0^2}{\omega}\right)+\frac{1}{R_1}\frac{N_1-N_2}{N_1}}{\frac{N_1-N_2}{N_1}\left[1+\frac{N_1}{N_2}\frac{R_T}{R_L}\right]-L_1C_2\left(\omega-\frac{\omega_0^2}{\omega}\right)^2\left[1+\frac{N_1-N_2}{N_2}\frac{R_T}{R_1}\right]+jR_1C_2\left(\omega-\frac{\omega_0^2}{\omega}\right)\left(1-\frac{N_1-N_2}{N_2}\frac{R_T}{R_1}\right)} \tag{7}$$

As $\omega$ moves away from $\omega_0$, the real part of the denominator decreases, passes through zero, and then rapidly increases in magnitude. Meanwhile, the imaginary part of the denominator slowly increases from zero. For small $R_1$ the real part of the denominator predominates. As $\omega$ moves away from $\omega_0$, the real part of the numerator remains fixed, while the imaginary part slowly increases from zero. Until $(\omega-\omega_0)$ is large, the magnitude of the numerator remains essentially constant. The magnitude of the transfer function would therefore be expected to exhibit a double-humped behavior, as sketched in FIG. 6. The peaks occur where the real part of the denominator passes through zero, which occurs when $$|\omega-\omega_0|=\frac{1}{2\sqrt{L_1C_2}} \tag{8}$$

Notation employed in the analysis of the present system is as follows:

$$Z(R_1, L_1, C_1)=Z_1=\left[jL_1\left(\omega-\frac{\omega_0^2}{\omega}\right)+R_1\right] \tag{9}$$

$$Y(R_2, L_2, C_2)=\frac{1}{Z_2}=\left[jC_2\left(\omega-\frac{\omega_0^2}{\omega}\right)+\frac{1}{R_2}\right] \tag{10}$$

$$[R_e+(1-\alpha)R_b]=R_T \tag{11}$$

Analysis

Transfer function of the model circuit (FIGURE 5) is $V_f/V_1$. Because of $T_1$, $$V_3=-\frac{N_2}{N_1}V_4 \tag{12}$$

But $$V_4=i_1Z_2 \tag{13}$$

So, from (12) and (13)

$$i_1=\frac{N_1}{N_2}\frac{1}{Z_2}V_3 \tag{14}$$

Now, we have $$i_e=i_1-\frac{V_2}{R_3} \tag{15}$$

But $$V_2=V_3+i_e[R_e+(1-\alpha)R_b]=V_3+i_eR_T \tag{16}$$

Using (16) in (15)

$$i_e=i_1-\frac{1}{R_3}[V_3+i_eR_T] \tag{17}$$

which arranges to $$V_1=V_3\frac{1+\frac{N_1}{N_2}\left[-\frac{R_T}{Z_2}-1-\frac{R_T}{R_3}-\frac{Z_1}{Z_2}\frac{R_T}{R_3}\right]}{1+\frac{R_T}{R_3}} \tag{21}$$

Now $$V_f=\alpha i_eR_4 \tag{22}$$

Equation 18 gives $i_e$ in terms of $V_3$, while Equation 21 gives $V_3$ in terms of $V_1$. Using these in (22), we get $$T(\omega, R_2, R_3)=\frac{V_f}{V_1}=-\frac{\alpha R_4\left[\frac{1}{Z_2}+\frac{N_2}{N_1}\frac{1}{R_3}\right]}{\left(1+\frac{R_T}{R_3}\right)-\frac{N_2}{N_1}+\left(1+\frac{R_T}{Z_1}+\frac{R_T}{R_3}\right)\frac{Z}{Z_2}} \tag{23}$$

This is the desired general transfer functions of the model. Note that $Z_1$ and $Z_2$ are functions of $\omega$ as given by (9) and (10).

For constant midband gain, we wish to choose $R_3$ such that $T(\alpha, R_2, R_3)$ is independent of $R_2$, the bandwidth control. At $\omega=\omega_0$, we have $Z_2=R_2$ and $Z_1=R_1$. We require $$\frac{\partial|T(\omega, R_2, R_3)|}{\partial R_2}=0 \tag{24}$$

Carrying out the indicated operation $T(\omega, R_2, R_3)$ as given by (23), we get, after some simplification:

$$R_3^2+\left[R_T-\frac{N_2}{N_1-N_2}R_1\right]R_3-\frac{N_2}{N_1-N_2}R_1R_T=0 \tag{25}$$

The two roots of this quadratic are $R_3=-R_T$ (negative resistance, impossible solution (26)

$$R_3=\frac{N_2}{N_1-N_2}R_1 \tag{27}$$

This is the desired condition.

With $R_3$ as given by (27), the transfer function becomes $$T(\omega)=-\alpha R_4\frac{\frac{1}{Zf(\omega)}+\frac{N_1-N_2}{N_1}\frac{1}{R_1}}{\frac{N_1-N_2}{N_1}\left[1+\frac{N_1}{N_2}\frac{R_T}{R_1}\left(1+\frac{Z_1(\omega)}{Z_2(\omega)}\right)\right]\frac{+Z_1(\omega)+R_T}{Z_2(\omega)}} \tag{28}$$

at $\omega=\omega_0$:

$$Z_1(\omega)=R_1$$
$$Z_2(\omega)=R_2$$

Giving $$T(\omega)|_{\omega=\omega_0}=-aR_4\frac{1}{R_1+R_T\frac{N_1}{N_2}} \quad (29)$$

which is independent of $R_2$ as required.

Reviewing now the operation of the system of FIGURE 4, as representing a preferred and actual embodiment of the invention, a series resonant piezo-electric filter 12 is connected in series with a resonant tank circuit 15 as a load, and with a small series resistance $R_3$ designed to sense filter and load current. Since the filter operates as a series circuit, it has a total resistive impedance at resonance, represented by $R_1$. The tank circuit 15 looks like a high resistance to the filter, at resonance, the value of which can be changed by varying the loading of the tank circuit. As loading is varied the effective resistance in series with filter 12 is also varied, which varies its selectivity, but also varies the voltage across the tank, constituting the normal output of such a system, and also the filter current.

In accordance with the invention voltage across the tank 15 is sensed by means of a sensing coil 30. Current in the filter is sensed as voltage across resistance $R_3$, and the latter voltage is combined with the voltage provided by sensing coil output to provide true output signal. It is then shown that if $$R_3=\frac{N_2}{N_1-N_2}R_1$$

gain of the system will remain independent of loading of tank 15.

Variable loading of the tank is achieved by inductively coupling to the tank a pair of diodes $D_1$, $D_2$, connected back to back, and variably forward biased identically by a control voltage. The resistance of the diodes $D_1$, $D_2$ in series is then the same for either direction of circulating current in the diode circuit, and the diodes look like a variable resistance the magnitude of which is a function of forward bias provided at terminal 26.

The mode of application of the forward bias, in parallel to both diodes, permits insertion of a current limiting resistance $R_d$ in common to the diodes from terminal 26, which has the ecect of reducing effect of temperature on the conductivity of the diodes $D_1$, $D_2$.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A bandpass filter system comprising a crystal filter operative in the series resonant mode, a load for said crystal filter serially coupled therewith, said load being a parallel resonant circuit tuned to the series resonance frequency of said crystal filter, a variable resistance loading means connected in shunt to said parallel resonant circuit to vary the selectivity of said crystal filter and means responsive to load voltage and current for maintaining the midband response of said filter system substantially constant irrespective of variation of said variable resistance loading means.

2. The combination according to claim 1 wherein said variable resistance loading means comprises a pair of diodes connected back to back in a loop, means inductively coupling said loop in balanced relation with respect to said diodes to said parallel resonant circuit, and means connected across said diodes for identically forward biasing said diodes.

3. The combination according to claim 2 wherein is provided a bias voltage terminal, a relatively high resistance, and means connecting said terminal via said relatively high resistance jointly to identical electrodes of said diodes.

4. A filter system comprising a bandpass filter having effective series resistance, a parallel resonant load circuit for said bandpass filter, a variable loading circuit for said parallel resonant load circuit, a relatively small current sensing resistance of value R being connected in series with said parallel resonant load circuit, said parallel resonant load circuit including a primary inductance, a voltage sensing secondary inductance coupled with said load circuit primary inductance, the number of turns of said secondary inductance being $N_2$ and of said primary inductance being $N_1$, means for linearly mixing the voltage across said current sensing resistance with the voltage induced in said voltage sensing secondary inductance from said parallel resonant load circuit, the relation of R to $N_2$ and $N_1$ being substantially the expression $$R=\frac{N_2}{N_1-N_2}R_1$$

where $R_1$ is said effective series resistance of said bandpass filter.

5. The combination according to claim 4 wherein said means for linearly mixing includes a transistor amplifier including two input electrodes and an output electrode, said input electrodes being connected across said relatively small current sensing resistance and across said secondary inductance.

6. The combination according to claim 4 wherein said variable loading circuit comprises a pair of diodes connected back to back in a loop, said loop including said secondary winding, and means connected jointly across said diodes for identically forward biasing said diodes.

7. A selectivity control circuit for a piezo-electric filter having resistance, comprising a load circuit coupled to said filter, means for varying the effective resistance of said load circuit in response to a control signal, a source of said control signal, means coupling said means for varying to said source of control signal and to said load circuit, means for sensing the current in said filter, means for sensing the voltage across said load circuit, means for converting said current to a further voltage, and means combining said voltage across said load circuit and said further voltage to provide substantially constant midband response despite variations of said effective resistance of said load circuit, wherein said further voltage is developed to have a magnitude dependent upon the ratio of sensed voltage across said load circuit to actual voltage across said load circuit and is proportional to the product of the circuit relationships between said voltage sensing means and said load circuit producing said ratio and the magnitude of said filter resistance.

8. A selectivity control circuit for a piezo-electric filter operating in the series mode and having series resistance, comprising a variable load circuit coupled to said filter, means for sensing the voltage across said load circuit and the current through said load circuit, and means for generating a response signal for said filter in response jointly to said current and said voltage, said response signal generating means including means for combining said current and voltage to provide a midband response independent of the effective resistance of said variable load circuit, said current and voltage combined in a relationship based upon circuit factors determining the ratio of sensed voltage to overall voltage across said load circuit and the magnitude of said filter resistance.

9. A selectivity control circuit for a piezo-electric filter operating in the series mode and having an effective series resistance $R_1$, comprising a parallel tuned load circuit for said filter including a first coil of $N_1$ turns, a current sensing resistance in series with said load circuit and having a value $R_3$, a voltage sensing second coil coupled to said first coil and having $N_2$ turns, and means for additively combining the voltage of said second coil with the voltage across said current sensing resistance, wherein the values of $R_1$, $R_3$, $N_1$ and $N_2$ are related substantially by the relation $$R_3=\frac{N_2}{N_1-N_2}R_1$$

10. A selectivity control circuit for a band pass filter having an effective resistance $R_1$, comprising a variable load circuit for said filter including a first coil of $N_1$ turns, a relatively small current sensing resistance of value $R_3$ in series with said load circuit, means for deriving a voltage from said coil, said last means including a second coil of $N_2$ turns coupled to said first coil, wherein is observed the relation $$R_3=\frac{N_2}{N_1-N_2}R_1$$

11. The combination according to claim 10 wherein said band pass filter is a series tuned filter.

12. The combination according to claim 10 wherein said variable load circuit is a variable loaded tank circuit tuned to the frequency of said band pass filter.

13. The combination according to claim 10 wherein said band pass filter is a piezo-electric filter operating in the series resonant mode and wherein said variable load circuit is a variable loaded tank circuit tuned to the frequency of said band pass filter.

14. The combination according to claim 13 wherein is provided control voltage responsive means for varying the loading of said tank circuit.

15. The combination according to claim 3 wherein said means for maintaining midband response substantially constant comprises load voltage sensing means coupled to said parallel resonant circuit, load current sensing means coupled to said parallel resonant circuit, and means for combining voltages derived from and proportional respectively to the sensed load voltage and the sensed load current to provide a relatively constant output voltage for said filter system in response to signal applied to said crystal filter, despite the variation of said selectivity of said filter.

16. The combination according to claim 15 wherein said load voltage sensing means comprises a coil inductively coupled to said parallel resonant circuit, said means for combining including means for detecting the voltage induced across said coil and the voltage across said resistance of said current sensing means.

17. The combination according to claim 16 wherein said parallel resonant circuit includes a coil having $N_1$ turns to which the coil of said load voltage sensing means is inductively coupled, said load voltage sensing means coil having $N_2$ turns, and wherein said resistance of said load current sensing means has a value substantially equal to that fraction of the effective series resistance of the crystal of said filter given by $N_2/(N_1-N_2)$.

18. A circuit for variably loading an inductive element, comprising an inductor inductively coupled to said inductive element, said inductor having a center tap connected to a point of reference potential, a pair of voltage controlled elements having substantially identical current conducting characteristics in which the level of current therethrough is dependent upon the magnitude of control voltage thereon, said controlled elements connected across said inductor with identical terminals of each coupled at a common junction, means connected between said common junction and said point of reference potential for applying control voltage jointly and identically to said controlled elements to render each of said controlled elements current conductive throughout the normal operation of said circuit, said means including a variable voltage source for selectively changing the magnitude of control voltage applied to said controlled elements to proportionately vary the current conducting characteristics thereof for circulating currents in either direction therethrough, and thereby to vary the impedance reflected into said inductive element via said inductive coupling.

19. The invention according to claim 18 wherein said voltage controlled elements are semiconductor diodes connected back-to-back across said inductor and normally forward biased by said control voltage.

20. The invention according to claim 18 wherein said means further includes means connected between said variable voltage source and said common junction for compensating the effects of temperature variation on the current conducting characteristics of said controlled elements.

21. The invention according to claim 20 wherein said temperature compensation means comprises a large-valued resistance serially connected between said source and said common junction.

22. A circuit for varying the impedance of an A-C network containing an inductive element by controlling the impedance reflected into said inductive element via an inductor inductively coupled thereto, said inductor having a grounded center tap, a pair of resistive elements each having an effective resistance that varies with the magnitude of voltage thereacross, said resistive elements connected identically from respective ends of said inductor to a common junction, and a variable control voltage source connected between ground and said common junction for jointly and identically controlling the resistivity of each of said resistive elements to permit the passage of current in either direction through said inductor in controlled amounts from a trickle current to a relatively heavy current, whereby to provide a variable impedance path for current in either direction through the entire loop containing said inductor and said resistive elements, and thereby correspondingly varying the impedance coupled into said network.

References Cited

UNITED STATES PATENTS

| | | | |
|---|---|---|---|
| 2,280,605 | 4/1942 | Roberts | 333—72 X |
| 3,214,680 | 10/1965 | Kroll | 307—88.5 X |
| 2,313,182 | 3/1943 | Thompson | 333—72 |
| 2,557,888 | 6/1951 | Olson | 330—145 X |

HERMAN K. SAALBACH, *Primary Examiner.*

PAUL L. GENSLER, *Assistant Examiner.*

U.S. Cl. X.R.

307—317; 333—28, 82; 334—40